(12) United States Patent
Schmitz et al.

(10) Patent No.: US 7,120,557 B2
(45) Date of Patent: Oct. 10, 2006

(54) SYSTEMS AND METHODS FOR ANALYZING DATA OF A SAS/SATA DEVICE

(75) Inventors: William J. Schmitz, Monument, CO (US); David T. Uddenberg, Colorado Springs, CO (US); William W. Voorhees, Colorado Springs, CO (US)

(73) Assignee: LSI Logic Corporation, Milpitas, CA (US)

( * ) Notice: Subject to any disclaimer, the term of this patent is extended or adjusted under 35 U.S.C. 154(b) by 4 days.

(21) Appl. No.: 10/423,082

(22) Filed: Apr. 25, 2003

(65) Prior Publication Data

US 2004/0215421 A1  Oct. 28, 2004

(51) Int. Cl.
*G06F 11/30* (2006.01)

(52) U.S. Cl. ...................... 702/183; 710/100
(58) Field of Classification Search ............. 702/183; 710/100
See application file for complete search history.

(56) References Cited

U.S. PATENT DOCUMENTS

| | | | |
|---|---|---|---|
| 5,457,694 A * | 10/1995 | Smith | 714/712 |
| 5,497,378 A * | 3/1996 | Amini et al. | 714/727 |
| 5,923,673 A * | 7/1999 | Henrikson | 714/712 |
| 6,111,717 A * | 8/2000 | Cloke et al. | 360/67 |
| 6,510,532 B1 | 1/2003 | Pelly et al. | |
| 6,629,062 B1 * | 9/2003 | Coffey et al. | 702/188 |
| 2003/0163639 A1 * | 8/2003 | Baum et al. | 711/113 |

* cited by examiner

*Primary Examiner*—Michael Nghiem
*Assistant Examiner*—Stephen J. Cherry
(74) *Attorney, Agent, or Firm*—Duft Bornsen & Fishman, LLP

(57) ABSTRACT

Systems and methods for analyzing data passing between an SAS/SATA device and a plurality of other devices are presented. A system includes a plurality of physical interfaces configured for passing data between the SAS/SATA device and the other devices. The system also includes a test interface, or test PHY, configured for coupling to the physical interfaces for analysis of the data passing through those physical interfaces. The test PHY may be integrally configured with the SAS/SATA device and may substantially minimize alteration of characteristic impedance caused by external analysis of the data. The system may also include a multiplexer for selectively coupling the PHYs to the test PHY.

15 Claims, 2 Drawing Sheets

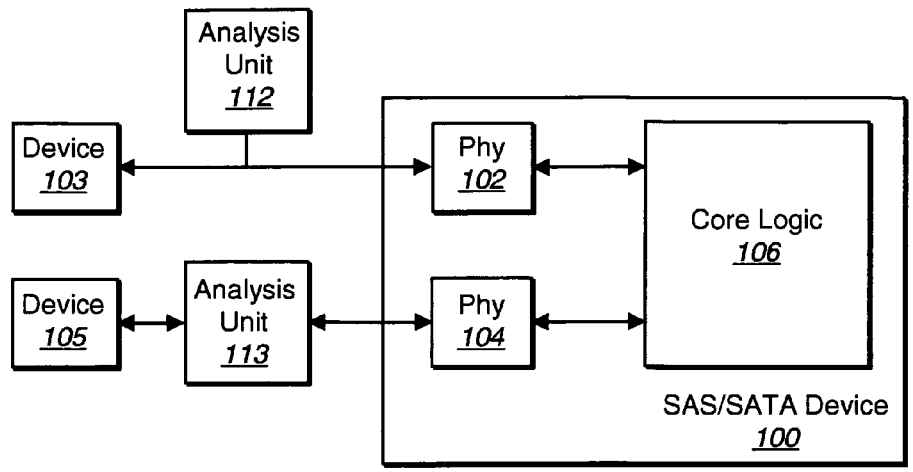
FIG._1
(PRIOR ART)
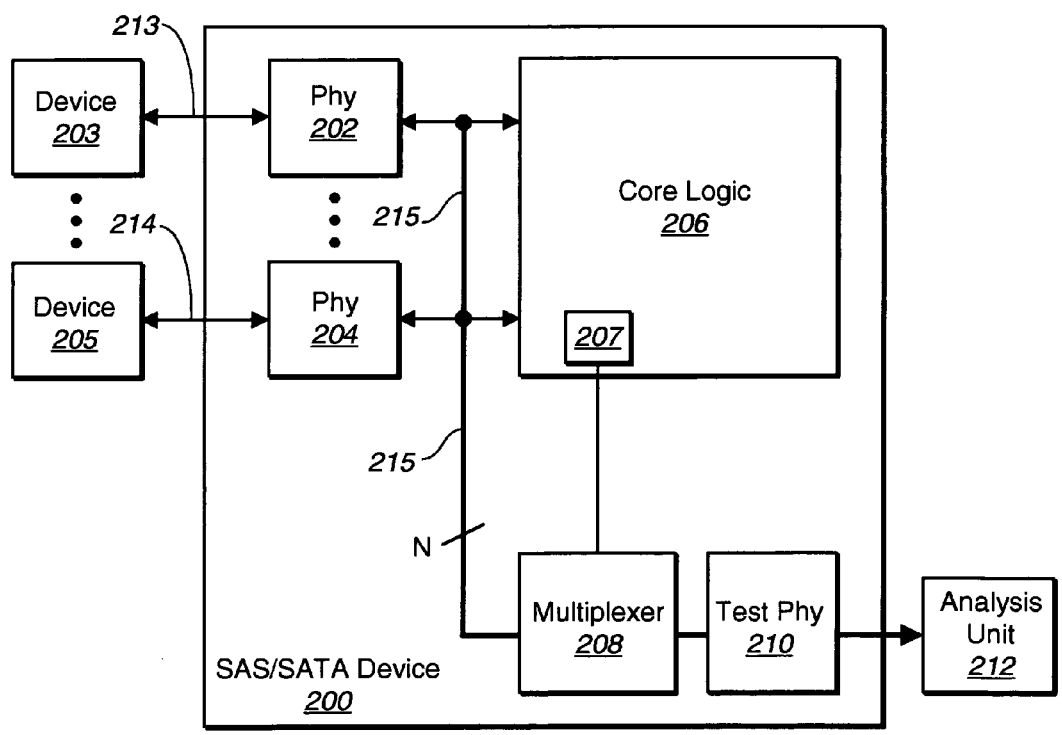
FIG._2

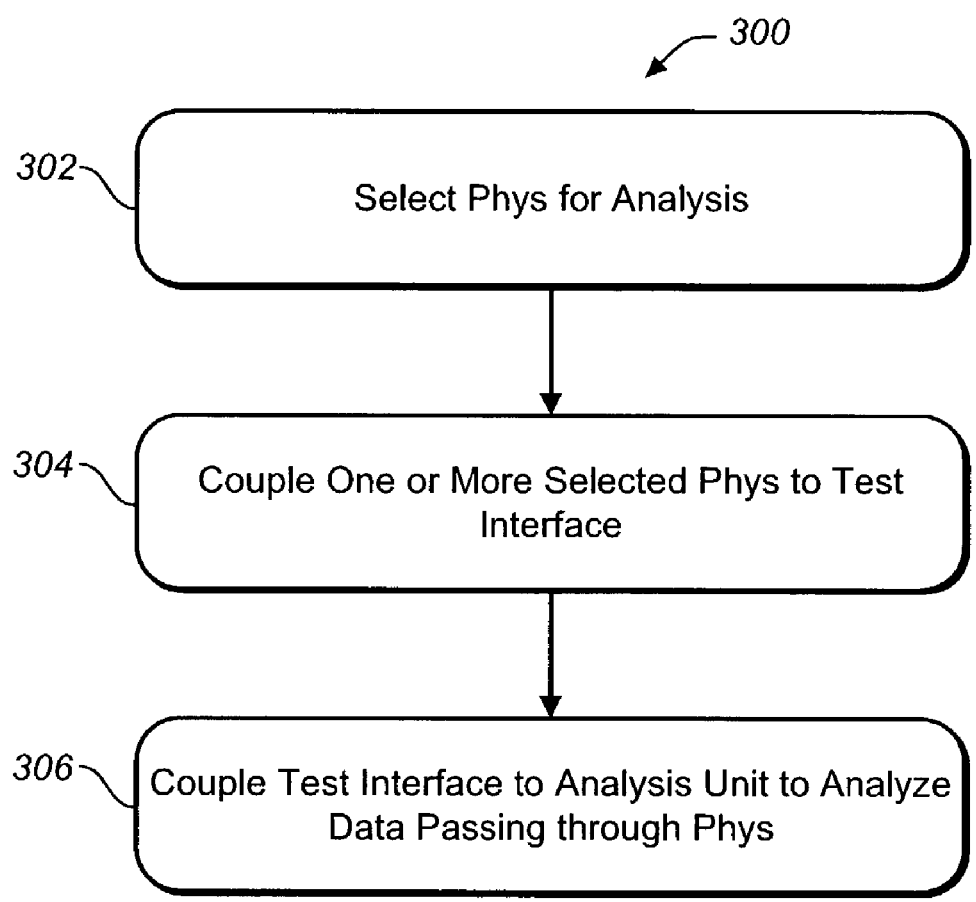
FIG._3

SYSTEMS AND METHODS FOR ANALYZING DATA OF A SAS/SATA DEVICE

BACKGROUND OF THE INVENTION

1. Field of the Invention

The invention generally relates to analyzing data transferred between a serial interface device and a plurality of other serial devices coupled thereto. More specifically, the invention relates to passively analyzing data through a test interface situated with either a Serial Attached SCSI (SAS) device or a Serial Advanced Technology Attachment (SATA) device. SCSI, as is known by those skilled in the art, represents Small Computer Systems Interface.

2. Related Patents

This application is related to U.S. patent application Ser. No. 10/423,081 entitled Systems and Methods for Analyzing Data of an SPI Data Bus (filed Apr. 25, 2003, herewith), which is incorporated herein by reference.

3. Discussion of the Related Art

A serial device is a device that serially transmits and receives data. Such serial communications are generally over a single bit wide communication medium such that each data bit to be exchanged is transferred in sequence and received in sequence. Serial communications may be applied to a number of communication media including conductive wire media as well as optical media such as fiber optic communication links. Further, such serial communications may be performed over wireless connections using, for example, light and other electromagnetic transmission techniques such as radio frequency and microwave frequency transmissions.

Examples of a serial device common in computing and storage applications may include an SAS device and an SATA device. An SAS device is a device that operates according to an SAS specification, such as SAS Revision 03-f. An SATA device also operates in accordance with the SAS specification. The SAS specification contains specifications for physical layers that are compatible with Serial ATA. The SAS specification also contains specifications of protocols for transporting SCSI commands to SAS devices and for transporting ATA commands to SATA devices. Such specifications are generally available from: http://www.t10.org. As used herein SAS and SATA shall be referred to as SAS/SATA.

An SAS/SATA device typically communicates to other devices through a plurality of on-board physical interfaces. The physical interface level is often referred to by a number of standard terms in the art—including simply "physical layer", or "PHY" In SAS/SATA standards, a logical layer of protocols includes the so-called PHY. Each PHY is configured for passing data between the SAS/SATA device and another device coupled thereto. As used herein, "physical layer", "PHY" or "PHY layer" all refer to a protocol layer that uses a physical transmission medium used for electronic communication including, but not limited to, the PHY layer as specified in the SAS/SATA standards.

It is often useful to monitor data transfers over the PHY layer of an SAS/SATA device because data transfer and protocol errors in a design can often be debugged by monitoring the transfers. It is common to apply external monitoring devices to the PHY communication medium to monitor the data transfers thereon. Examples of such external monitoring devices include general purpose logic analyzers or special purpose communication analyzers that probe the PHY communication medium and monitor the transfers.

High speed data transfers through communication media associated with various PHYs often require precise signal timing. Timing errors, or skew, of the signals or other noise can cause, inter alia, incorrect transfers resulting in eventual data corruption. External analyzers are often connected "inline" to the communication medium of a PHY under analysis to view the data passing through the PHY communication medium. In other instances, the analyzer may couple to the data bus of the PHY with a probe that "taps" into the data passing through the bus. For example, one analyzer probe electrically couples to one PHY communication medium when analysis of that associated PHY is desired. When analysis of data through another PHY is desired, the probe is physically moved to the other PHY.

Connecting such external analyzers to probe the data passing through the communication medium often alters impedance characteristics (e.g., loading) to the PHYs due, in part, to additive capacitance and/or additive resistance. These altered impedance characteristics can degrade signal timing and signal quality such that analysis of the data is no longer valid or useful. For example, once an analyzer probe is electrically coupled to a particular PHY communication medium, the probe changes the characteristic impedance and subsequently alters the timing of the data passing through the PHY. Since the probe creates artificial timing errors, use of the analyzer probe may alter the problem originally being investigated. In some instances, the probe "masks", or eliminates, a timing error so that the error goes undetected altogether.

Other problems associated with external probing of the PHYs include physical manipulation of the probes. Each time analysis of a different PHY is desired; the probe must be disconnected from one communication medium and connected to another. This physical manipulation of the probe can physically stress the components and may eventually damage the components of the communication medium or its associated PHY interface. Moreover, physical manipulation of probes is simply cumbersome and time consuming.

It is evident from the above discussion that there is an ongoing need to provide improved methods and structures for analyzing data transferred between PHYs of a SAS/SATA device and a plurality of devices coupled thereto.

SUMMARY OF THE INVENTION

The present invention solves the above and other problems and advances the state of the useful arts by providing systems and methods for analyzing data passing between serial devices. More specifically, the present invention assists in analyzing data passing through PHYs of an SAS/SATA device in a manner that substantially mitigates impedance changes.

In one exemplary preferred embodiment of the invention, an SAS/SATA device includes one or more PHYs that pass data between the SAS/SATA device and other devices coupled thereto. The SAS/SATA device also includes a test PHY that is communicatively coupled to the PHYs of the SAS/SATA device. The test PHY may be substantially integrated with the SAS/SATA device and hence may substantially minimize alteration of impedance characteristics when probing signals. In another embodiment, a multiplexer selects which data is to pass through the test PHY thereby eliminating a need for physical coupling of a probe to another PHY each time a change of analysis is desired.

In one aspect of the invention, an SAS/SATA device comprises: a plurality of physical interfaces configured for passing data between the SAS/SATA device and a plurality of devices coupled thereto; and a test interface configured for coupling the physical interfaces for analysis of the data passing through the physical interfaces.

In another aspect of the invention, the test interface substantially minimizes alteration of characteristic impedance of the physical interfaces.

In another aspect of the invention, the SAS/SATA device further comprises a multiplexer communicatively connected between the physical interfaces and the test interface and configured for selectively coupling one or more of the PHYs to the test interface for data analysis of selected PHYs.

In another aspect of the invention, the SAS/SATA device further comprises a register communicatively coupled to the multiplexer and having addresses configured for assisting the multiplexer in selection of the data for analysis, wherein each address corresponds to an individual physical interface.

In another aspect of the invention, the SAS/SATA device further comprises SAS/SATA core logic.

In another aspect of the invention, the test interface is substantially integrated with the SAS/SATA device.

In one aspect of the invention, a method provides for analyzing data passing between a plurality of devices and an SAS/SATA device, comprising: selecting from a plurality of physical interfaces of the SAS/SATA device; and coupling one or more of selected said physical interfaces to a test interface of the SAS/SATA device.

In another aspect of the invention, the step of selecting comprises a step of accessing a register of the SAS/SATA device to select one or more of the physical interfaces.

In another aspect of the invention, the step of accessing comprises a step of corresponding an address stored with the register to one of said physical interfaces.

In another aspect of the invention, the step of coupling comprises a step of passing the data of said physical interfaces to the test interface while the data continues passing between the plurality of devices and the SAS/SATA device, wherein the test interface substantially minimizes impedance to the data.

In another aspect of the invention, the method further comprises a step of coupling the test interface to an analysis unit to analyze the data, wherein the test interface is substantially integrated with the SAS/SATA device.

In another aspect of the invention, the method further comprises a step of selectively coupling one or more channels of one or more of said physical interfaces to the test interface.

In one aspect of the invention, an SAS/SATA system for analyzing data passing between an SAS/SATA device and a plurality of devices coupled thereto, comprises: a plurality of physical interfaces substantially integrated with the SAS/SATA device and configured for passing data between the SAS/SATA device and the plurality of devices; an analysis unit configured for analyzing the data passing through the physical interfaces; a test interface substantially integrated with the SAS/SATA device and configured for passing the data to the analysis unit, wherein the test interface substantially minimizes alteration of characteristic impedance of the physical interfaces; and a multiplexer communicatively connected between the physical interfaces and the test interface and configured for selectively coupling one or more of the physical interfaces to the test interface.

In another aspect of the invention, the SAS/SATA system further comprises a register substantially integrated with the SAS/SATA device and configured for corresponding addresses to the physical interfaces such that the multiplexer selectively couples one or more of the physical interfaces to the test interface.

In another aspect of the invention, the multiplexer is adapted to selectively couple one or more channels of each physical interface to the test interface.

BRIEF DESCRIPTION OF THE DRAWINGS

FIG. 1 shows a prior art SAS/SATA device.

FIG. 2 shows an SAS/SATA device in an exemplary preferred embodiment of the invention.

FIG. 3 shows a block diagram illustrating steps involved with analyzing data of a SAS/SATA device in an exemplary preferred embodiment of the invention.

DETAILED DESCRIPTION OF THE DRAWINGS

While the invention is susceptible to various modifications and alternative forms, a specific embodiment thereof has been shown by way of example in the drawings and will herein be described in detail. Those skilled in the art will appreciate that the features described below can be combined in various ways to form multiple variations of the invention. As a result, the invention is not limited to the specific examples described below, but only by the claims and their equivalents.

FIG. 1 shows a prior art SAS/SATA device 100. SAS/SATA device 100 comprises core logic 106 that communicates through PHYs 102 and 104 to respective devices 103 and 105 coupled thereto. This SAS/SATA device communication includes transmit and receive data and is well-known to those skilled in the art.

When data through the PHYs is to be analyzed, an external analysis unit (e.g., analysis units 112 and 113) electrically couples to a communication link passing transmit and receive data of a particular PHY. Typically, an analysis unit is either coupled between the device and the PHY (e.g., analysis unit 113) as an in-line analysis unit or coupled by a probe electrically connected to the communication link (e.g., analysis unit 112). In either case, the analysis unit intrusively analyzes the data passing through a particular PHY with its connection to the data line. This intrusion into the data line may corrupt the data by altering impedance to the line, as impedance discontinuities often alter voltage levels and "edge rates" of the data. As used herein, edge rates relate to "rise" and "fall" times of data, and, therefore, relate to data speed. Edge rates of data may be of particular importance as serial communication development typically focuses on data speed.

Analysis of the data is often necessary to detect data transfer and protocol errors. For example, when a designer debugs an SAS/SATA device, the designer may wish to view the data passing through the PHYs to determine sources of data errors. However, this intrusive form of external analysis can create skew or noise that causes, inter alia, incorrect transfers resulting in eventual data corruption because of altered characteristic impedance. In some instances, the errors being debugged are masked by the altered impedance such that the errors go undetected altogether.

FIG. 2, shows an exemplary preferred embodiment of the invention in SAS/SATA device 200. SAS/SATA device 200 includes test PHY 210 (e.g., a test physical interface) integrally configured with device. Test PHY 210 couples to a plurality of other PHYs also integrally configured with device 200 (e.g., PHYs 202 . . . 204) so that data passing through the PHYs may be analyzed by analysis unit 212.

The PHYs couple core logic 206 with other SAS/SATA devices coupled thereto (e.g., devices 203 and 205) via logic level data bus 215 and physical communication media 213 and 214. In a typical configuration, the PHYs include a transmit channel and a receive channel that allow core logic 206 to exchange data with other devices. When analysis unit 212 is coupled to test PHY 210, the analysis unit may non-intrusively examine protocols and/or various other logic signals of the data passing through the other PHYs.

In one embodiment of the invention, test PHY 210 non-intrusively couples, via data bus 215, to PHYs 202 and 204 for analysis of the data passing between the PHYs and the core logic 206. Data bus 215 may be an N-channel data bus having as many data channels as there are PHY-channels on SAS/SATA device 200. By non-intrusively coupling to PHYs 202 and 204 through data bus 215, test PHY 210 may receive signals exchanged between core logic 206 and PHYs 202 and 204 with substantially minimal alteration to the characteristic impedance of PHYs 202 and 204. Such a non-intrusive coupling may maintain the integrity of the data since minimal impedance is added to the connection through bus 215 and no impedance is added to the communication links 213 and 214. In this embodiment, data bus 215 may be implemented as conductive traces substantially integrated with the design of SAS/SATA device 200.

In another embodiment, SAS/SATA device 200 comprises multiplexer 208. Multiplexer 208 is communicatively coupled to logic level data bus 215 to selectively couple PHYs 202 and 204 to test PHY 210 for analysis. Multiplexer 208 may also be integrally configured with SAS/SATA device 200, in one embodiment. As an example, when a user wishes to analyze both receive and transmit data passing through a particular PHY, multiplexer 208 may be programmed to selectively couple signals on bus 215 corresponding to that particular PHY to test PHY 210 so that analysis unit 212 may analyze the data.

Additionally, multiplexer 208 may be configured to selectively couple signals on bus 215 corresponding to multiple PHYs to test PHY 210 and/or individual channels of PHYs to test PHY 210. In such an embodiment, multiplexer 208 may be in effect an N:M multiplexer having N input signal paths, each input signal path communicatively coupled to a channel of one of the PHYs, and having M output signal paths for selectively coupling any M of the N input signal paths to an input of the test PHY 210. Those skilled in the art will recognize that multiplexer 208 may be constructed of multiple N:1 multiplexer devices or any other generalized switching device to allow flexible coupling of one or more selected input signals from the data bus 215 to one or more input signal paths of test PHY 210.

In one embodiment, register 207 is configured for storing information about physical interfaces to permit programmable selection through multiplexer 208. For example, register 207 may store addresses of PHYs that allow the user to programmably select PHY 202 and/or PHY 204 according to the addresses that correspond to those PHYs. In another embodiment, register 207 may store addresses of individual channels of each PHY such that multiplexer 208 may selectively couple individual channels of PHYs 202 and 204 to test interface 210. More generally, register 207 may be any circuit or device suitable to programmably select a configuration of multiplexer 208. Such a multiplexer/register combination may be useful in analyzing data passing through PHYs because, among other reasons, a user may selectively analyze the data without physically moving probes to connect to the PHYs.

While this exemplary embodiment illustrates devices 203 and 205 and PHYs 202 and 204, it is not intended to be limited to the number of devices or PHYs shown. Rather, those skilled in the art should appreciate that numerous PHYs may be integrally configured with the SAS/SATA device 200 with numerous devices respectively coupled thereto. Furthermore, those skilled in the art should appreciate that such a test PHY as 210 may be used with other types of serial devices, such as those using serial point-to-point protocols known to those skilled in the art.

FIG. 3 shows a block diagram 300 illustrating steps involved with analyzing data of a SAS/SATA device in an exemplary preferred embodiment of the invention. The data typically comprises transmit and receive data passing between the SAS/SATA device and a plurality of other devices respectively coupled to a plurality of PHYs of the SAS/SATA device. A selection is made from the plurality of PHYs of the device in step 302. Such a selection may include a step of accessing a register integrally configured with the SAS/SATA device to select one or more of the PHYs. The register is accessed to configure the PHYs for which analysis is desired or to select individual transmit or receive channels of selected PHYs for analysis. The output of the register so configured will cause appropriate selection to couple the test PHY to the desired channels and/or PHYs Upon selection, the PHYs are coupled to a test interface, such as test PHY 210 of FIG. 2, in step 304. Such a coupling may be communicatively performed with a multiplexer, such as multiplexer 208 of FIG. 2, or other communication coupling device, such as a switch. This coupling of PHYs and/or PHY channels to the test interface may be performed while data continually passes between the SAS/SATA device and other devices coupled thereto through the PHYs.

PHYs and/or PHY channels that are coupled to the test interface may be coupled to an analysis unit in step 306. The analysis unit may analyze the data in one of many well-known manners. For example, the analysis unit may be a protocol analyzer that analyzes SAS/SATA protocols being passed between the SAS/SATA device and the other devices. Other types of analysis may include signal timing analysis with either an oscilloscope or logic analyzer.

Advantages of the above mentioned embodiments include non-intrusive selection of PHYs for analysis. Other advantages include an ability to programmably select PHYs for analysis, thereby eliminating a need to physically connect and disconnect cables and/or probes to the PHYs when a change of analysis is desired.

While the invention has been illustrated and described in the drawings and foregoing description, such illustration and description is to be considered as exemplary and not restrictive in character. One embodiment of the invention and minor variants thereof have been shown and described. Protection is desired for all changes and modifications that come within the spirit of the invention. Those skilled in the art will appreciate variations of the above-described embodiments that fall within the scope of the invention. As a result, the invention is not limited to the specific examples and illustrations discussed above, but only by the following claims and their equivalents.

What is claimed is:

1. A Serial Attached SCSI and/or Serial Advanced Technology Attachment ("SAS/SATA") device implemented as an integrated circuit, comprising:

a plurality of physical interfaces within the integrated circuit and each configured for passing data between the SAS/SATA device and a corresponding device coupled thereto; and a test interface within the integrated circuit integrated with the plurality of physical interfaces within the integrated circuit, the test interface configured for coupling the physical interfaces to the SAS/SATA device to thereby enable analysis of the SAS/SATA data passing through the physical interfaces to and/or from the corresponding device during normal operation of the SAS/SATA device.

2. The SAS/SATA device of claim 1, wherein the test interface substantially minimizes alteration of characteristic impedance of the physical interfaces.

3. The SAS/SATA device of claim 1, further comprising a multiplexer communicatively connected between the physical interfaces and the test interface and the multiplexer configured for selectively coupling one or more of the physical interfaces to the test interface for data analysis of selected physical interfaces.

4. The SAS/SATA device of claim 3, further comprising a register communicatively coupled to the multiplexer and the register having addresses configured for assisting the multiplexer in selection of the data for analysis, wherein each address corresponds to an individual physical interface.

5. The SAS/SATA device of claim 1, further comprising SAS/SATA core logic.

6. The SAS/SATA device of claim 1, wherein the test interface is substantially integrated with the SAS/SATA device.

7. A method of analyzing data passing between a plurality of devices and a Serial Attached SCSI and/or Serial Advanced Technology Attachment (SAS/SATA) device that comprises an integrated circuit, comprising:
   selecting one or more interfaces from a plurality of physical interfaces of the SAS/SATA device; and
   coupling the one or more selected interfaces to a test interface of the SAS/SATA device to permit analysis of SAS/SATA data exchanged through the one or more selected interface during normal operation of the SAS/SATA device,
   wherein the plurality of physical interfaces and the test interface and the coupling therebetween are all internal to the integrated circuit that comprises the SAS/SATA device.

8. The method of claim 7, wherein the step of selecting comprises a step of accessing a register of the SAS/SATA device to select one or more of the physical interfaces.

9. The method of claim 8, wherein the step of accessing comprises a step of establishing correspondence of an address stored within the register to one of said physical interfaces.

10. The method of claim 7, wherein the step of coupling comprises a step of passing the data of said physical interfaces to the test interface while the data continues passing between the plurality of devices and the SAS/SATA device, wherein the test interface substantially minimizes impedance to the data.

11. The method of claim 7, further comprising a step of coupling the test interface to an analysis unit to analyze the data, wherein the test interface is substantially integrated with the SAS/SATA device.

12. The method of claim 7, further comprising a step of selectively coupling one or more channels of one or more of said physical interfaces to the test interface.

13. A Serial Attached SCSI and/or Serial Advanced Technology Attachment (SAS/SATA) system for analyzing data passing between an SAS/SATA device that comprises an integrated circuit and a plurality of devices coupled thereto, comprising:
   a plurality of physical interfaces substantially integrated within the integrated circuit that comprises the SAS/SATA device and configured for passing data between the SAS/SATA device and the plurality of devices;
   an analysis unit configured for analyzing the SAS/SATA data passing through the physical interfaces during normal operation of the SAS/SATA device;
   a test interface substantially integrated within the integrated circuit that comprises the SAS/SATA device and configured for passing the data to the analysis unit, wherein the test interface substantially minimizes alteration of characteristic impedance of the physical interfaces; and
   a multiplexer substantially integrated within the integrated circuit that comprises the SAS/SATA device and communicatively connected between the physical interfaces and the test interface and configured for selectively coupling within the SAS/SATA device one or more of the physical interfaces to the test interface.

14. The SAS/SATA system of claim 13, further comprising a register substantially integrated with the SAS/SATA device and configured for establishing correspondence between addresses and physical interfaces such that the multiplexer selectively couples one or more of the physical interfaces to the test interface.

15. The SAS/SATA system of claim 13, wherein the multiplexer is adapted to selectively couple one or more channels of each physical interface to the test interface.

* * * * *